US009953399B2

(12) United States Patent
Jin

(10) Patent No.: US 9,953,399 B2
(45) Date of Patent: Apr. 24, 2018

(54) DISPLAY METHOD AND DISPLAY DEVICE

(71) Applicant: BOE TECHNOLOGY GROUP CO., LTD., Beijing (CN)

(72) Inventor: Xiaodan Jin, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 14/762,096

(22) PCT Filed: Jan. 8, 2015

(86) PCT No.: PCT/CN2015/070364
§ 371 (c)(1),
(2) Date: Jul. 20, 2015

(87) PCT Pub. No.: WO2016/033925
PCT Pub. Date: Mar. 10, 2016

(65) Prior Publication Data
US 2016/0253781 A1  Sep. 1, 2016

(30) Foreign Application Priority Data
Sep. 5, 2014  (CN) .......................... 2014 1 0451873

(51) Int. Cl.
G06T 3/40 (2006.01)
G09G 3/20 (2006.01)

(52) U.S. Cl.
CPC ......... *G06T 3/4053* (2013.01); *G09G 3/2018* (2013.01); *G09G 3/2074* (2013.01);
(Continued)

(58) Field of Classification Search
CPC .... H04N 1/00458; H04N 13/026; G06T 5/50; G06T 2207/20212; G06T 2207/20221;
(Continued)

(56) References Cited

U.S. PATENT DOCUMENTS 5,608,851 A * 3/1997 Kobayashi ............ G06T 11/001
345/591
5,748,802 A * 5/1998 Winkelman ............ G06T 5/009
382/169
(Continued)

FOREIGN PATENT DOCUMENTS

CN 1906931 A 1/2007
CN 101420612 A 4/2009
(Continued)

OTHER PUBLICATIONS

Notification of the First Office Action dated Aug. 1, 2016 corresponding to Chinese application No. 201410451873.4.
(Continued)

*Primary Examiner* — Haixia Du
(74) *Attorney, Agent, or Firm* — Nath, Goldberg & Meyer; Joshua B. Goldberg

(57) ABSTRACT

The present invention relates to a display method and a display device. The display method includes steps of: S1, obtaining an original image that needs to be displayed; S2, generating a plurality of first images each having the same boundary as the original image according to the information contained in the original image, wherein each first image includes at least partial information of the original image, and union of information contained in the plurality of first images includes all information contained in the original image; and S3, displaying, in the form of continuous multi-frame images, all first images in sequence within visual persistence time of human eyes. The above method can improve the display effect of the display device.

20 Claims, 2 Drawing Sheets

(52) U.S. Cl.
CPC . *G09G 2300/0439* (2013.01); *G09G 2340/04* (2013.01); *G09G 2340/0407* (2013.01); *G09G 2340/0457* (2013.01)

(58) Field of Classification Search
CPC ......... G06T 2207/30121; G06T 3/4053; G06T 5/40; G06T 5/009; G06T 7/11; G06T 15/00; G06T 2207/10012; G06T 7/44; G06T 2207/20021; G06T 2207/20208; G06T 2207/20228; H01L 27/3211; G09G 2300/0443; G09G 2310/0235; G09G 3/3413; G09G 3/2025; G09G 2300/023; G06K 9/4642

See application file for complete search history.

(56) References Cited

U.S. PATENT DOCUMENTS

| | | | | |
|---|---|---|---|---|
| 5,757,355 A * | 5/1998 | Ogura | ................... | G06T 3/4007 345/660 |
| 6,683,982 B1 * | 1/2004 | Kohn | ................... | H04N 9/11 348/E9.009 |
| 2009/0184978 A1 * | 7/2009 | Blonde | ................ | G06T 1/0028 345/647 |
| 2010/0142807 A1 * | 6/2010 | Yasuda | .............. | G06K 9/00624 382/164 |
| 2010/0188488 A1 | 7/2010 | Birnbaum et al. | | |
| 2010/0265281 A1 * | 10/2010 | Furukawa | ............ | G09G 3/3413 345/691 |
| 2013/0058572 A1 * | 3/2013 | Kao | ..................... | G06T 3/4007 382/167 |
| 2013/0182002 A1 * | 7/2013 | MacCiola | .............. | H04N 1/387 345/589 |
| 2014/0225940 A1 * | 8/2014 | Nakagawa | ........... | G09G 3/3607 345/690 |
| 2016/0125822 A1 * | 5/2016 | Kang | .................. | G09G 3/2003 345/691 |

FOREIGN PATENT DOCUMENTS

| | | |
|---|---|---|
| CN | 101697111 A | 4/2010 |
| CN | 101795374 A | 8/2010 |
| CN | 104240213 A | 12/2014 |

OTHER PUBLICATIONS

International Search Report dated May 27, 2015 issued in International Application No. PCT/CN2015/070364 along with the English translation of the Written Opinion of the International Searching Authority.

* cited by examiner

DISPLAY METHOD AND DISPLAY DEVICE

This is a National Phase Application filed under 35 U.S.C. 371 as a national stage of PCT/CN2015/070364, filed Jan. 8, 2015, an application claiming the benefit of Chinese Application No. 201410451873.4, filed Sep. 5, 2014, the content of each of which is hereby incorporated by reference in its entirety.

FIELD OF THE INVENTION

The present invention relates to the field of display technology, and particularly relates to a display method and a display device.

BACKGROUND OF THE INVENTION

In the field of display technology, the resolution is an important parameter reflecting the display effect, and directly indicates the definition of display. In a broad sense, the resolution includes spatial resolution and time resolution. But generally, the resolution of a display device refers to the spatial resolution, i.e., the number of pixels in each row and the number of pixels in each column.

With continuous improvement of preparation process, the resolution of the display device is improved continuously. Taking a cell phone as an example, the resolution is increased significantly from QVGA to the present FHD, 2K in recent years. At the same time, with continuous increase in the resolution of the display device, it becomes more difficult to increase the resolution of the display device. Due to the limit of the aperture ratio of pixels, pixel circuits, etc., it is difficult to prepare more pixel points on a display panel.

Therefore, a technical solution in which the resolution of the display device is increased by changing the arrangement mode of pixels has been proposed in the prior art. FIG. 1 is a schematic diagram of pixels in PenTile arrangement mode in an existing display device. As shown in FIG. 1, each pixel R forms a pixel point D1 together with a pixel B and a pixel G which are located on the left side of the pixel R and forms a pixel point D2 together with a pixel G and a pixel B which are located at the right side of the pixel R; in addition, each pixel B forms a pixel point D3 together with a pixel R and a pixel G which are located on the left side of the pixel B and forms a pixel point D4 together with a pixel G and a pixel R which are located at the right side of the pixel B. It can be known from the above that, compared with the standard RGB arrangement mode, the PenTile arrangement mode increases the number of pixel points by sharing the pixel R and the pixel G on the premise that the number of pixels R, G and B remains unchanged, so as to improve the resolution of the display device.

However, in the PenTile arrangement mode, only one pixel can be shared between two adjacent pixel points generally, which limits the number of pixel points that can be increased, i.e., the display effect of the display device cannot be improved further after the resolution of the display device is increased to a certain extend.

SUMMARY OF THE INVENTION

The present invention is intended to solve at least one of the technical problems in the prior art, and provides a display method and a display device, and with the display method, the display effect of the display device is improved by displaying an image that needs to be displayed as continuous multi-frame images within the visual persistence time of human eyes.

To achieve the object of the present invention, a display method is provided, including steps of:

S1, obtaining, through a display device, an original image that needs to be displayed;

S2, generating a plurality of first images each having the same boundary as the original image according to information contained in the original image, wherein each first image includes at least partial information of the original image, and union of information contained in the plurality of first images includes all information contained in the original image; and S3, displaying, in the form of continuous multi-frame images, all first images in sequence through the display device within visual persistence time of human eyes.

Preferably, resolution of the first images is equal to that of the display device.

Preferably, resolution of the original image is higher than that of the display device.

Preferably, each first image includes partial information of the original image, and all pixels of each first image are used for storing information of the original image.

Preferably, each first image includes partial information of the original image, one part of pixels of each first image stores information of the original image, and the other part of pixels stores matching information which is calculated according to the information of the original image contained in said first image.

Preferably, resolution of the original image is equal to that of the display device.

Preferably, each first image includes partial information of the original image, one part of pixels of each first image stores information of the original image, and the other part of pixels stores matching information which is calculated according to the information of the original image contained in said first image.

Preferably, resolution of the original image is lower than that of the display device.

Preferably, each first image includes all information of the original image.

Preferably, each first image includes partial information of the original image.

Preferably, one part of pixels of each first image stores information of the original image, and the other part of pixels stores matching information, which is calculated according to the information of the original image contained in said first image.

As another technical solution, the present invention also provides a display device for performing display according to the display method provided by the present invention, wherein the display device includes:

an image input terminal, configured to obtain an original image that needs to be displayed;

an image processing module, configured to generate a plurality of first images with the same boundaries as the original image according to information of the original image, wherein each first image includes at least partial information of the original image, and union of information contained in the plurality of first images includes all information contained in the original image; and a display module, configured to display, in the form of continuous multi-frame images, all first images in sequence within visual persistence time of human eyes.

The present invention has the following beneficial effects:

in the display method provided by the present invention, a plurality of first images each having the same boundary as the original image are generated according to the original image that needs to be displayed by the display device, wherein each first image at least includes partial information of the original image, and the union of information contained in the plurality of first images includes all information of the original image; when the display device displays an image, all first images are displayed in the form of continuous multi-frame images in sequence within visual persistence time of human eyes to enable human eyes to catch the union of information contained in the respective first images, i.e., enabling eyes to catch all information contained in the original image; therefore, the display device can also enable human eyes to catch all information of the original image even if the resolution of the original image is higher than that of the display device; in addition, when the resolution of the original image is higher than, equal to or lower than that of the display device, the display device can make the resolution of the images observed by human eyes higher than the resolution of the original image and make the information caught by human eyes more than the information contained in the original image, and therefore, the display method provided by the present invention can improve the display effect of the display device.

The display device provided by the present invention realizes display according to the display method provided by the present invention, and also enables human eyes to catch all information of the original image when the resolution of the original image is higher than that of the display device; in addition, when the resolution of the original image is higher than, equal to or lower than that of the display device, the display device can make the resolution of the images observed by human eyes higher than the resolution of the original image and the information caught by human eyes more than the information contained in the original image, and therefore, the display device provided by the present invention can have better display effect.

BRIEF DESCRIPTION OF THE DRAWINGS

Accompanying drawings, which form a part of the description, are used for providing further understanding of the present invention and explaining the present invention together with the following specific implementations, but do not constitute a limitation on the present invention. In the drawings.

REFERENCE NUMERALS

10: display device; 101: image input terminal; 102: image processing module; 103: display module; P: original image; S: first image.

DETAILED DESCRIPTION OF THE EMBODIMENTS

The specific implementations of the present invention are described in details below in conjunction with the accompanying drawings. It should be understood that the embodiments described herein are only used for describing and explaining the present invention, but not limit the present invention.

Figure 1:
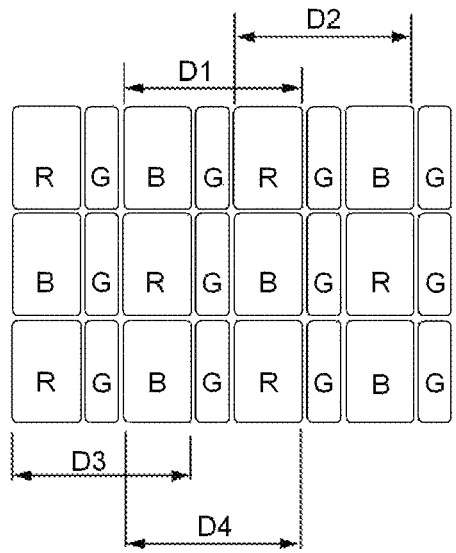
FIG. 1 is a schematic diagram of pixels in PenTile arrangement mode in an existing display device.
Figure 2:
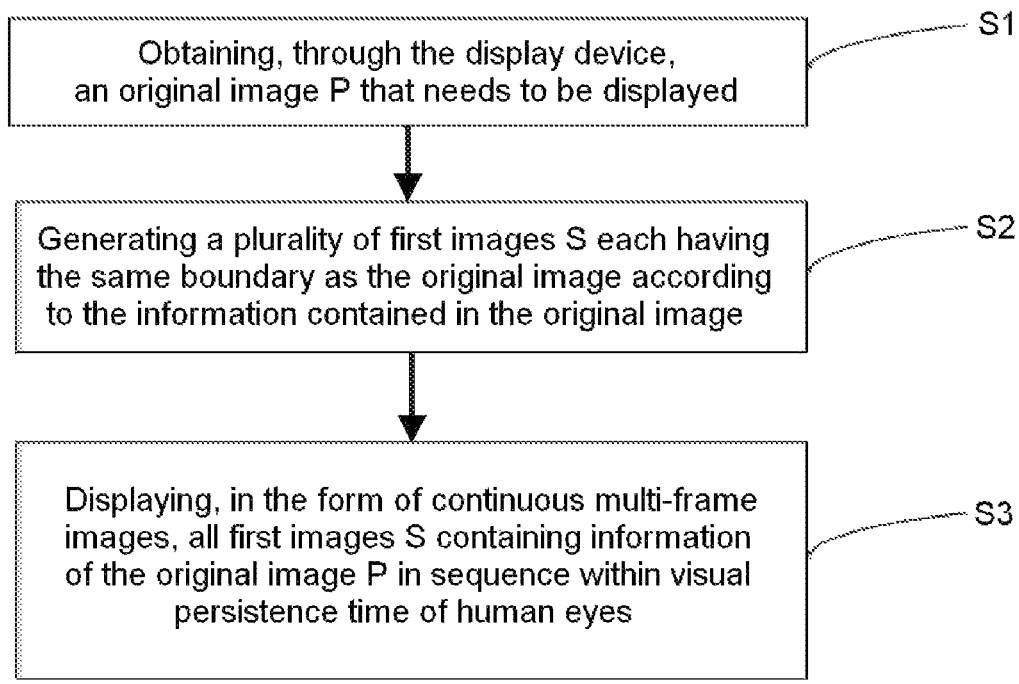
FIG. 2 is a flow chart of a display method provided by an embodiment of the present invention.

FIG. 2 is a flow chart of a display method provided by an embodiment of the present invention. As shown in FIG. 2, the display method provided by the embodiment of the present invention includes the following steps:

S1, obtaining, through a display device, an original image P that needs to be displayed.

Here, the original image P refers to an image transmitted by a display card, etc. to the display device for display. The resolution of the original image P may be higher than, equal to or lower than that of the display device.

S2, generating a plurality of first images S each having the same boundary as the original image P according to information contained in the original image P, wherein each first image S includes at least partial information of the original image P, and the union of information contained in the plurality of first images S includes all information contained in the original image P.

Here, the "information" contained in the original image P refers to the displayed brightness and color of each pixel of the original image P; the "boundary" of an image refers to the edge contour of the image (such as four sides of a rectangular image), and indicates the overall "shape" and "dimension" of the image.

Preferably, in step S2, the brightness of each area of each generated first image S is similar to that of each area of the original image P. In other words, information of the original image P contained in each first image S has an intersection, and the information of the intersection is the brightness information (which forms the main structure of the original image P) of each main area of the original image P, so that the "structure" of each first image S is similar to that of the original image P. Here, the "structure" of an image refers to an area (which can be interpreted as a boundary of adjacent areas that have obviously different brightness in the image) where the frequency domain information of the image is aggregated, and the brightness roughly presented by each area. Specifically, the similarity of the structures of the first image S and the original image P means that the information of the original image P contained in each first image S is extracted from the respective areas of the original image P, and the relative position relationship of the respective pieces of information extracted from the original image P in the first image S is roughly the same as that in the original image P. For example, when the original image P is a white-background identification photo of a person, it can be understood that, the main structure of the original image P includes an area occupied by white background, an area occupied by hair which is mostly black and an area occupied by face which is mostly yellow. In this case, the intersection of the information contained in the respective first images S is the brightness information of the area occupied by white background, the area occupied by hair which is mostly black and the area occupied by face which is mostly yellow in the original image P, and positions in each first image S corresponding to the intersection information is the same as the positions of the area occupied by white background, the area occupied by hair which is mostly black and the area occupied by face which is mostly yellow in the original image P. In addition to the above intersection information, the information of the original image P contained in each first image S may also include the brightness information of a small amount of pixels and the color information of pixels of the original image P. That is, the plurality of first images S may also respectively include part of the brightness information of areas other than the main areas in the original image P and/or part of the color information of pixels in the original image P, so that the union of information contained in the plurality of first images S include all information of the original image P.

Specifically, in step S2, the information of the original image P may be "distributed" to the plurality of (at least two) first images S, wherein each first image S includes partial information (or all information in the event that the resolution of the original image P is lower than that of the first image S) of the original image P, and the union of information contained in the first images S includes all information contained in the original image P (of course, some additional information may also be included).

Preferably, the resolution of the first images S is equal to that of the display device.

S3, displaying, in the form of continuous multi-frame images, all first images S containing information of the original image P in sequence within visual persistence time of human eyes.

In step S3, when the plurality of first images S1 to Sn are displayed in the form of continuous multi-frame images in sequence within visual persistence time of human eyes, the information contained in the plurality of first images S1 to Sn can be superimposed in human eyes, thereby enabling human eyes to catch the union of information contained in the plurality of first images S1 to Sn.

In this embodiment, a plurality of first images S each having the same boundary as the original image P are generated according to the original image P that needs to be displayed, each first image S includes at least partial information of the original image P, and the union of information contained in the plurality of first images S includes all information of the original image P; all first images S are displayed by the display device in the form of continuous multi-frame images in sequence within visual persistence time of human eyes to enable human eyes to catch the union of information contained in the plurality of first images S, i.e., enable human eyes to catch all information contained in the original image P, thereby realizing the lossless display of the original image P by the display device. In addition, as the image structure of each first image S is similar to that of the original image P, the image caught by human eyes, namely the superimposition of the plurality of first images S displayed by the display device, is the same as the original image P (there are no differences which can be observed by human eyes between the superimposition of the plurality of first images S and the original image P) or similar to the original image P (there are differences which are difficult to be observed by human eyes between the superimposition of the plurality of first images S and the original image P) to the human eyes.

Specifically, when the resolution of the original image P is higher than that of the display device, if the original image P is directly displayed by the display device, there will certainly be a lot of details and information lost during the display process, and the picture quality of the image displayed by the display device is lower than that of the original image P itself. In this embodiment, the information contained in the original image P with higher resolution (higher than that of the display device) can be distributed to the plurality of first images S, so that each first image S includes partial information of the original image P, and all of the pixels of each first image S are used for storing information of the original image P, i.e., the union of information contained in the plurality of first images S is equal to all information contained in the original image P. Therefore, by means of a high refresh rate of the display device, all of the plurality of first images S containing information of the original image P are displayed in the form of continuous multi-frame images within visual persistence time of human eyes to enable human eyes to catch all information contained in the plurality of first images S, thereby realizing the technical effect of sensing all information contained in the original image P by human eyes. That is, all information contained in the original image P with higher resolution can be losslessly displayed by the display device with lower resolution. Compared with the case in which an original image P with higher resolution is directly displayed by a display device with lower resolution, and a lot of details and information are lost during the display, the display method of present invention improves the display effect of the display device.

In the context, "pixels are used for storing partial information of the original image P" means that the storage space (such as the specific storage space in a memory) allocated for the data (such as brightness information, color information, etc.) of a certain pixel is used for storing partial information of the original image P. Similarly, "the other part of pixels of the first image S is used for storing matching information" described below means that the storage space allocated for the other part of pixels of the first image S is used for storing matching information.

In this embodiment, Single-Frame Super Resolution (hereinafter referred to as SFSR) technique in the field of image processing is used in reverse. The so-called SFSR technique means that, extra information and details are obtained through a series of training images on the basis of a low-resolution image, and the obtained extra information and details are supplemented to the low-resolution image, so as to obtain the required high-resolution image. By contrast, in this embodiment, the plurality of first images S with lower resolution are generated according to the original image P with higher resolution, to make the union of information contained in all first images S include all information of the original image P.

In this embodiment, instead of the configuration that all pixels of each first image S are used for storing information of the original image P, the following configuration may also be used: one part of pixels of each first image S stores information of the original image P, and this part of pixels forms the structure of the first image S, meanwhile, the other part of pixels of the first image S stores matching information which is calculated according to the information of the original image P contained in the first image S. Specifically, the information which should be contained in the other part of pixels is calculated by the SFSR technique according to a series of training images in order to be distributed to the other part of pixels for storage. In this case, the union of information contained in the plurality of first images S is richer than all information contained in the original image P. That is to say, when the display device with lower resolution displays the original image P with higher resolution inputted to the display device, the resolution of the image observed by human eyes is higher than that of the original image P, and the information caught by human eyes is more than that contained in the original image P, so that the display device with lower resolution can not only losslessly display the original image P with higher resolution, but can also perform super resolution processing on the original image P, and the resolution of the image observed by an observer is higher than that of the original image P, and therefore, the display effect of the display device is further improved.

When the resolution of the original image P and the resolution of the first images S are equal and both of them are equal to that of the display device, if the original image P is directly displayed by the display device, the resolution of the image displayed by the display device will be relatively low and the display effect of the display device will be relatively poor in the case that the resolutions of the display device and the original image P are relatively low. In this embodiment, the information contained in the original image P is distributed to the plurality of first images S, and each first image S includes partial information of the original image P; it can be understand that partial information of the original image P can be stored by only part of pixels of the first image S; in this case, one part of pixels of each first image S stores information of the original image P, and this part of pixels forms the structure of the first image S, meanwhile, the other part of pixels of the first image S stores matching information which is calculated according to the information of the original image P contained in the first image S. Specifically, the information which should be contained in the other part of pixels is calculated by the SFSR technique according to a series of training images. In this case, when the display device displays the original image P inputted thereto, compared with the original image P, the image observed by human eyes has additional details and information which are not contained in the original image P, so that the resolution of the image observed by human eyes is higher than that of the original image P, the information caught by human eyes is more than that contained in the original image P, and therefore, the display effect of the display device can be improved.

When the resolution of the original image P is lower than that of the display device, if the original image P is directly displayed by the display device, the quality of the image displayed by the display device will be relatively low and the display effect of the display device will be relatively poor due to lower resolution of the original image P. In this embodiment, the information contained in the original image P is distributed to the plurality of first images S, and each first image S includes partial information of the original image P; it can be understood that partial information of the original image P can be stored by only part of pixels of the first image S; in this case, one part of pixels of each first image S stores information of the original image P, and this part of pixels forms the structure of the first image S, meanwhile, the other part of pixels of the first image S stores matching information which is calculated according to the information of the original image P contained in the first image S. Specifically, the information which should be contained in the other part of pixel is calculated by the SFSR technique according to a series of training images. In this case, when the display device displays the original image P inputted thereto, compared with the original image P, the image observed by human eyes has additional details and information which are not contained in the original image P, so that the resolution of the image observed by human eyes is higher than that of the original image P, the information caught by human eyes is more than that contained in the original image P, and therefore, the display effect of the display device can be improved.

In this embodiment, beside the configuration that each first image S includes partial information of the original image P, the configuration that each first image S includes all information of the original image P may also be used. It can be understood that with such configuration, the structure and details of each generated first image S is more approximate to the displayed content of the original image P, and thus the image displayed by the display device is more nearly the same as the original image P.

In conclusion, in the display method provided by the embodiment of the present invention, a plurality of first images S each having the same boundary as the original image P are generated according to the original image P that needs to be displayed by the display device, wherein each first image S includes at least partial information of the original image P, and the union of information contained in the plurality of first images S includes all information of the original image P; when the display device displays images, all first images S are displayed in the form of continuous multi-frame images in sequence within visual persistence time of human eyes to enable human eyes to catch the union of information contained in respective first images S, i.e., enabling human eyes to catch all information contained in the original image P; therefore, the display device can also enable human eyes to catch all information of the original image P even if the resolution of the original image P is higher than that of the display device; when the resolution of the original image P is higher than, equal to or lower than that of the display device, the display device can make the resolution of the images observed by human eyes higher than the resolution of the original image P, the information caught by human eyes is more than the information contained in the original image P, and therefore, the display method provided by the embodiment of the present invention can improve the display effect of the display device.

Figure 3:
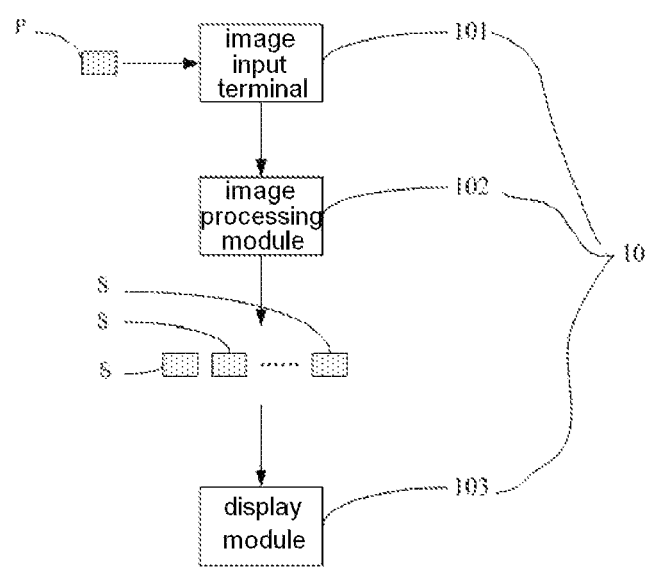
FIG. 3 is a functional block diagram of a display device provided by an embodiment of the present invention.

As another technical solution, the embodiment of the present invention further provides a display device for performing display according to the display method provided by the embodiment of the present invention. FIG. 3 is a schematic diagram of functional components of a display device provided by an embodiment of the present invention. As shown in FIG. 3, the display device 10 includes:

an image input terminal 101, configured to obtain an original image P that needs to be displayed;

an image processing module 102, configured to analyze information contained in the original image P and image structure formed by the information, and generate a plurality of first images S each having the same boundary as the original image P according to the information and the image structure of the original image P, wherein each first image includes at least partial information of the original image, and the union of information contained in the plurality of first images includes all information contained in the original image; and a display module 103, configured to display, in the form of continuous multi-frame image, all first images S containing information of the original image P within visual persistence time of human eyes.

In this embodiment, the resolution of the original image P can be higher than, equal to or lower than that of the display device. According to the display method provided by the embodiment of the present invention, when the resolution of the original image P is higher than that of the display device 10, the display device 10 can enable human eyes to catch all information of the original image P, and even make the resolution of the image observed by human eyes higher than that of the original image P, and the information caught by human eyes is more than that contained in the original image P; when the resolution of the original image P is equal to or lower than that of the display device 10, the display device 10 can make the resolution of the image observed by human eyes higher than that of the original image P, and the information caught by human eyes is more than that contained in the original image P. Therefore, the display device 10 provided by the embodiment of the present invention can have better display effect.

It should be understood that the above implementations are only exemplary implementations for illustrating the principle of the present invention; however, the present invention is not limited thereto. Various variations and improvements can be made by a person skilled in the art without departing from the spirit and essence of the present invention, and these variations and improvements should also be considered to be within the protection scope of the present invention.

The invention claimed is:

1. A display method, comprising steps of:
   S1, obtaining, through a display device, an original image that needs to be displayed;
   S2, generating a plurality of first images each having a same edge contour as the original image according to information contained in the original image wherein each first image comprises at least partial information of the original image; the information contained in the original image contained in each first image includes brightness and color of pixels; each of the plurality of first images comprises brightness information of each main area of the original image, each main area being an area where frequency domain information of the original image is aggregated; a relative position, in each first image, of the information of the original image comprised in the first image is the same as a relative position of the information in the original image; an area of each first image contains all of information of the original image corresponding to the area; and union of information contained in the plurality of first images comprises all information contained in the original image; and
   S3, displaying, in the form of continuous multi-frame images, all first images in sequence through the display device within visual persistence time of human eyes.

2. The display method of claim 1, wherein resolution of the first images is equal to that of the display device.

3. The display method of claim 2, wherein resolution of the original image is higher than that of the display device.

4. The display method of claim 2, wherein resolution of the original image is equal to that of the display device.

5. The display method of claim 2, wherein resolution of the original image is lower than that of the display device.

6. The display method of claim 1, wherein resolution of the original image is higher than that of the display device.

7. The display method of claim 6, wherein each first image comprises partial information of the original image, and all pixels of each first image are used for storing information of the original image.

8. The display method of claim 6, wherein each first image comprises partial information of the original image, one part of pixels of each first image stores information of the original image, and the other part of pixels stores matching information which is calculated according to the information of the original image contained in said first image.

9. The display method of claim 1, wherein resolution of the original image is equal to that of the display device.

10. The display method of claim 9, wherein each first image comprises partial information of the original image, one part of pixels of each first image stores information of the original image, and the other part of pixels stores matching information which is calculated according to the information of the original image contained in said first image.

11. The display method of claim 1, wherein resolution of the original image is lower than that of the display device.

12. The display method of claim 11, wherein each first image comprises all information of the original image.

13. The display method of claim 12, wherein one part of pixels of each first image stores information of the original image, and the other part of pixels stores matching information which is calculated according to the information of the original image contained in said first images.

14. The display method of claim 11, wherein each first image comprises partial information of the original image.

15. The display method of claim 14, wherein one part of pixels of each first image stores information of the original image, and the other part of pixels stores matching information which is calculated according to the information of the original image contained in said first images.

16. A display device, for performing display according to the display method of claim 1, wherein the display device comprises:
   an image input terminal, configured to obtain an original image that needs to be displayed;
   an image processor, configured to generate a plurality of first images each having a same edge contour as the original image according to information of the original image, wherein each first image comprises at least partial information of the original image; each of the plurality of first images comprises brightness information of each main area of the original image, each main area being an area where frequency domain information of the original image is aggregated; a relative position, in each first image, of the information of the original image comprised in the first image is the same as a relative position of the information in the original image; an area of each first image contains all of information of the original image corresponding to the area; and union of information contained in the plurality of first images comprises all information contained in the original image; and
   a display module, configured to display, in the form of continuous multi-frame images, all first images in sequence within visual persistence time of human eyes.

17. The display device of claim 16, wherein resolution of the first images is equal to that of the display device.

18. The display device of claim 16, wherein resolution of the original image is higher than that of the display device.

19. The display device of claim 16, wherein each first image comprises partial information of the original image, and all pixels of each first image are used for storing information of the original image.

20. The display device of claim 16, wherein each first image comprises partial information of the original image, one part of pixels of each first image stores information of the original image, and the other part of pixels stores matching information which is calculated according to the information of the original image contained in said first image.

* * * * *